(12) United States Patent
Suwa et al.

(10) Patent No.: US 8,457,185 B2
(45) Date of Patent: Jun. 4, 2013

(54) WIRELESS COMMUNICATION DEVICE AND WIRELESS COMMUNICATION SYSTEM

(75) Inventors: Yutaka Suwa, Fukuoka (JP); Hiroyuki Ishihara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 59 days.

(21) Appl. No.: 13/142,218

(22) PCT Filed: Dec. 25, 2009

(86) PCT No.: PCT/JP2009/007268
§ 371 (c)(1),
(2), (4) Date: Jun. 24, 2011

(87) PCT Pub. No.: WO2010/073709
PCT Pub. Date: Jul. 1, 2010

(65) Prior Publication Data
US 2011/0261869 A1  Oct. 27, 2011

(30) Foreign Application Priority Data
Dec. 25, 2008 (JP) .................................. 2008-329334

(51) Int. Cl.
*H04W 4/00* (2009.01)

(52) U.S. Cl.
USPC ............................ 375/224; 375/259; 375/245

(58) Field of Classification Search
USPC ......................................... 375/224, 245, 259
See application file for complete search history.

(56) References Cited

U.S. PATENT DOCUMENTS

| 5,974,584 | A | * | 10/1999 | Hendrickson et al. ........ 714/800 |
| 6,574,769 | B1 | | 6/2003 | Ramaswamy |
| 2007/0161404 | A1 | * | 7/2007 | Yasujima et al. ............. 455/557 |
| 2008/0071523 | A1 | | 3/2008 | Oshikiri |

FOREIGN PATENT DOCUMENTS

| JP | 5-153067 | 6/1993 |
| JP | 7-143074 | 6/1995 |
| JP | 7-221718 | 8/1995 |
| JP | 8-316919 | 11/1996 |
| JP | 2000-40996 | 2/2000 |
| JP | 2002-509387 | 3/2002 |
| WO | 2006/009075 | 1/2006 |

OTHER PUBLICATIONS

International Search Report dated Mar. 16, 2010.

* cited by examiner

*Primary Examiner* — Shuwang Liu
*Assistant Examiner* — Michael Neff
(74) *Attorney, Agent, or Firm* — Dickinson Wright PLLC

(57) ABSTRACT

A wireless communication device sets a digital link on a wireless channel between a master device and a slave device, compresses a sound signal in an ADPCM scheme, and carries the sound signal in a sound packet to perform communication. In a master device, a PCM signal is converted into ADPCM data by an ADPCM encoding unit. Next, the least significant bit of n-bits is set according to the number of "1" of the n-bits of the ADPCM data by a transmission conversion table. In a slave device, it is determined whether error has occurred according to the number of "1" of the n-bit data in received data. If error exists, the n-bit sound data is converted into mute data through a reception conversion table. The sound data converted through the reception conversion table is converted into a PCM signal from an ADPCM format by an ADPCM decoding unit.

11 Claims, 16 Drawing Sheets

FIG.6

RECEPTION CONVERSION TABLE

| TABLE R1 | TABLE R2 | TABLE R3 | TABLE R4 |
|---|---|---|---|
| 0000 | 0000 | 0000 | 1111 |
| 0001 | 1111 | 1111 | 1111 |
| 0010 | 0011 | 1111 | 1111 |
| 0011 | 1111 | 0010 | 1111 |
| 0100 | 0101 | 1111 | 1111 |
| 0101 | 0110 | 0100 | 1111 |
| 0110 | 1111 | 0101 | 1111 |
| 0111 | 1111 | 0000 | 1111 |
| 1000 | 1001 | 1111 | 1111 |
| 1001 | 1010 | 1111 | 1111 |
| 1010 | 1111 | 1011 | 1111 |
| 1011 | 1100 | 1101 | 1111 |
| 1100 | 1111 | 1111 | 1111 |
| 1101 | 1111 | 1111 | 1111 |
| 1110 | 1111 | 1111 | 1111 |
| 1111 | 1111 | 1111 | 1111 |

RECEIVED DATA 0000
0001
0010
0011
0100
0101
0110
0111
1000
1001
1010
1011
1100
1101
1110
1111

WIRELESS COMMUNICATION DEVICE AND WIRELESS COMMUNICATION SYSTEM

BACKGROUND

1. Technical Field

The present invention relates to a wireless communication device and a wireless communication system, which perform communication by sound packets.

2. Background Art

The communication quality of wireless communication is greatly affected by the electric field strength of a transmitted radio wave, the distance between devices, and the existence of an interference radio wave. To cope with this, for example, a technique described in a wireless telephone system of JP-T-2002-509387 is known.

The wireless telephone system of JP-T-2002-509387 as described above includes a base transceiver and a wireless handset for a fixed-size audio packet composed of a plurality of audio data samples and a plurality of error correction bits, and changes the relative numbers of the audio data samples and bits allocated to the error correction bits with respect to the packet construction of the subsequent audio packet by determining whether or not an error rate has been changed through monitoring of the quality of a digital link on a wireless channel.

That is, if the error rate is deteriorated, the wireless telephone system performs switching of the quality level from the highest quality level to an intermediate quality level or a low quality level through reduction of the data amount of the audio data sample included in a packet with a fixed size, and widens the distance range or gives a high tolerance to the interference radio wave through an increase of the data amount of the error correction bits.

Since the wireless telephone system described in JP-T-2002-509387 performs switching of the quality level from the highest quality level to the intermediate quality level or the low quality level due to the deterioration of the sound data rate in order to increase the data amount of the error correction bits when the error rate is heightened due to the deterioration of the communication environment, it is considered that the sound quality is deteriorated.

However, it is hard for a user to use the wireless telephone system in which the sound quality is deteriorated to follow the deterioration of the communication environment. Accordingly, it is required to maintain the sound quality to some extent even if the communication environment is deteriorated.

SUMMARY

Accordingly, an object of the present invention is to provide a wireless communication device and a wireless communication system which can maintain the sound quality without changing the data rate of the sound and improve the accuracy of error detection in a fixed-size packet even if a communication environment is deteriorated.

A wireless communication device according to an aspect of the invention is so configured that it includes a base unit and a handset, establishes a digital link on a wireless channel between the base unit and the handset, and performs communication by a sound packet that includes a plurality of digital sound data and error detection bits, and the wireless communication device includes: data transmission means for converting a part of the digital sound data into the error detection bit to transmit the data with the error detection bit; and data conversion means for converting the digital sound data according to a value of the received error detection bit.

Further, a wireless communication system according to an aspect of the invention is so configured that it has a first communication terminal and a second communication terminal, establishes a digital link on a wireless channel between the first communication terminal and the second communication terminal, compresses a sound signal in an adaptive differential pulse code modulation (ADPCM) scheme, and carries the sound signal in a sound packet to perform communication, wherein the first communication terminal includes: an ADPCM encoding unit which converts a PCM signal into ADPCM data and outputs n-bit ADPCM data; a transmission side processing unit which converts the ADPCM data into data having an operation of a parity signal by reversing the least significant bit of the n bits according to the number of "1" of the n bits of the ADPCM data; and a transmission circuit unit which wirelessly transmits the n-bit data output from the transmission side processing unit, and the second communication terminal includes: a reception circuit unit which receives a wireless signal sent from the first communication terminal and generates n-bit data from the wireless signal; a reception side processing unit which determines whether or not an error has occurred according to the number of "1" of the n-bit data output from the reception circuit unit and converts the n-bit data, in which it is determined that the error has occurred, into n-bit ADPCM mute data to output the n-bit ADPCM mute data; and an ADPCM decoding unit which converts the n-bit ADPCM format data from the reception side processing unit into a PCM signal.

According to the aspect of the present invention, if the deterioration of the communication environment starts, a transmission side converts a part of the digital sound data into error detection bits to transmit the data with error detection bits, and a reception side converts the digital sound data according to the values of the received error detection bits. Accordingly, error detection can be performed with respect to the respective digital sound data with the data rate of the sound maintained, and thus the error detection accuracy can be improved with the sound quality maintained to some extent even if the communication environment is deteriorated.

BRIEF DESCRIPTION OF DRAWINGS

FIG. 6 is a diagram illustrating a reception conversion table.

DESCRIPTION

Figure 1:
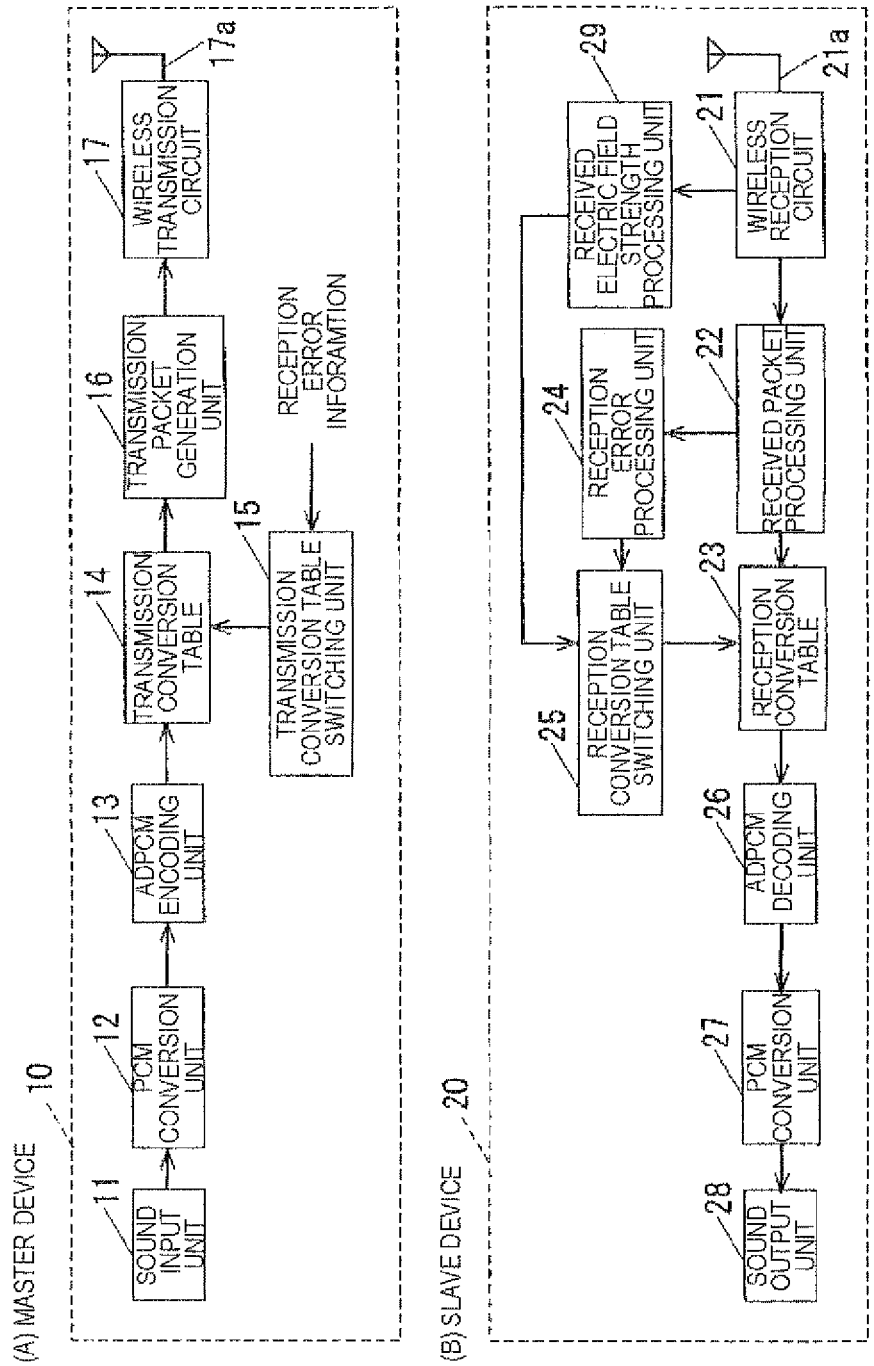
In FIG. 1, (A) and (B) are diagrams illustrating a cordless telephone according to an embodiment of the invention.

In a first aspect of the present invention, a wireless communication device, which includes a base unit and a handset, establishes a digital link on a wireless channel between the base unit and the handset, and performs communication by a sound packet that includes a plurality of digital sound data and error detection bits, is configured to include data transmission means for converting a part of the digital sound data into the error detection bit to transmit the data with the error detection bit, and data conversion means for converting the digital sound data according to a value of the received error detection bit. According to the present invention, since the data transmission means on a transmission side converts a part of the digital sound data into the error detection bit and transmits the data with the error detection bit, and the data conversion means on a reception side converts the digital sound data according to the value of the error detection bit, the error detection can be performed with respect to the respective digital sound data while the data rate of the sound data is maintained.

In a second aspect of the invention, the wireless communication device is so configured that the digital sound data is data obtained by adaptive differential pulse code modulation (ADPCM), the total number of bits of the respective ADPCM data is fixed, and a bit except for a plurality of bits input to an adaptive inverse quantizer of the ADPCM is considered as the error detection bit. According to the present invention, in the case where the digital sound data is data obtained by the ADPCM, since the bit except for the bits input to the adaptive inverse quantizer of the ADPCM is considered as the error detection bit, a prediction signal that is generated by an adaptive predictor is not affected by the error detection bit, and thus the sound packet can be transmitted or received by the ADPCM with the sound quality maintained to some extent.

In a third aspect of the invention, the wireless communication device is so configured that it includes error determination means for determining the change of the error rate through monitoring of the digital link, and the data transmission means selects whether or not to convert a part of the digital sound data into the error detection bit based on the result of the determination by the error determination means. According to the present invention, if the result of the determination performed by the error determination means is good, the data transmission means can select not to convert a part of the digital sound data into the error detection bit, and thus the digital sound data may not include the error detection bit. Accordingly, in the case where the communication environment is good, the sound packet can be transmitted or received with the highest sound quality.

In a fourth aspect of the invention, the wireless communication device is so configured that the error determination means increases or decreases the error rate by an error of data for synchronization and an error of the error detection bit added to data for a control signal or the entire sound packet.

According to the present invention, the error determination means determines the increase/decrease of the error rate by taking into consideration not only the error detection bit included in the digital sound data but also the error of the data for synchronization and the error detection bit added to the data for the control signal or the entire sound packet, and thus can cope with the error occurrence with higher accuracy.

In a fifth aspect of the invention, the wireless communication device is so configured that the error determination means increases or decreases the error rate through an error counter by making the error counter count up when it is determined that the error has occurred by the value of the error detection bit and making the error counter count down when it is determined that the error has not occurred. According to the present invention, the wireless communication device can cope with the deteriorated or good communication environment by increasing or decreasing the error rate through the error counter.

In a sixth aspect of the invention, the wireless communication device is so configured that the data conversion means converts the digital sound data, in which it is determined that an error has occurred by the value of the error detection bit, into mute data. According to the present invention, the data conversion means can suppress the influence of sound disintegration when the error occurs by converting the digital sound data, in which the error has occurred, into the mute data.

In a seventh aspect of the invention, the wireless communication device is so configured that the data conversion means converts the digital sound data, in which it is determined that the error has occurred by the value of the error detection bit, into the mute data, and converts the digital sound data, in which the error has not occurred in the same frame, into data in which the sound is attenuated. According to the present invention, since in an environment where many errors occur, only conversion of the digital sound data, in which it is determined that the error has occurred, into the mute data may cause a clicking noise (hereinafter referred to as a "click noise") to be generated according to the linear form of the digital sound data, the data conversion means can suppress the influence of the click noise by converting the digital sound data in which it is determined that the error has not occurred in the same frame so that the sound is attenuated.

In an eighth aspect of the invention, the wireless communication device is so configured that if it is determined that the error has occurred by the value of the error detection bit, the data conversion means converts all the digital sound data in the same frame into the mute data. According to the present invention, the data conversion means can suppress the click noise more effectively by converting all the digital sound data in the same frame into the mute data through the occurrence of the error.

In a ninth aspect of the invention, the wireless communication device is so configured that the data conversion means has a plurality of data conversion tables, and selects one of the plurality of the data conversion tables based on the result of the determination by the error determination means, and converts the received digital sound data through the selected data conversion table. According to the present invention, the data conversion means converts the digital sound data through selection of one of the plurality of data conversion tables, and thus the conversion of the digital sound data can be simply performed.

In a tenth aspect of the invention, the wireless communication device is so configured that the data conversion means sets the range of the error rate that corresponds to the plurality of conversion tables, and selects the data conversion table that corresponds to the error rate counted by the error determination means. According to the present invention, the data conversion means can select the process according to the degree of error occurrence by selecting one of the plurality of date conversion tables for converting the digital sound data according to the range of the error rate.

In an eleventh aspect of the invention, the wireless communication device is so configured that it includes received electric field strength level determination means for determining the change of a received electric field strength through monitoring of the digital link, and the data transmission means selects whether or not to convert a part of the digital sound data into the error detection bit based on the result of the determination by the received electric field strength level determination means. According to the present invention, since the data transmission means can select whether or not to convert a part of the digital sound data into the error detection bits according to the received electric field strength determined by the received electric field strength level determination means, the wireless communication device can cope with the communication environment in which the reception level is deteriorated or becomes good.

In a twelfth aspect of the invention, a wireless communication system which has a first communication terminal and a second communication terminal, establishes a digital link on a wireless channel between the first communication terminal and the second communication terminal, compresses a sound signal in an adaptive differential pulse code modulation (ADPCM) scheme, and carries the sound signal in a sound packet to perform communication, wherein the first communication terminal includes an ADPCM encoding unit which converts a PCM signal into ADPCM data and outputs n-bit ADPCM data, a transmission side processing unit which converts the ADPCM data into data having an operation of a parity signal by reversing the least significant bit of the n bits according to the number of "1" of the n bits of the ADPCM data, and a transmission circuit unit which wirelessly transmits the n-bit data output from the transmission side processing unit, and the second communication terminal includes a reception circuit unit which receives a wireless signal sent from the first communication terminal and generates n-bit data from the wireless signal, a reception side processing unit which determines whether or not an error has occurred according to the number of "1" of the n-bit data output from the reception circuit unit and converts the n-bit data, in which it is determined that the error has occurred, into n-bit ADPCM mute data to output the n-bit ADPCM mute data, and an ADPCM decoding unit which converts the n-bit ADPCM type data from the reception side processing unit into a PCM signal. According to the present invention, the transmission side processing unit of the first communication terminal converts a part of the n-bit ADPCM data into the error detection bit to transmit the converted data, and the reception side processing unit of the second communication terminal converts the digital sound data according to the values of the received n bits. Accordingly, the error detection can be performed with respect to the respective digital sound data while the data rate of the sound data is maintained, and the error-detected digital sound data can be converted into the mute data.

Embodiment

A wireless communication device according to an embodiment of the invention, of which an example is a cordless telephone, will be described based on the drawings. FIG. 1 is a diagram illustrating a cordless telephone according to an embodiment of the invention. In FIG. 1, (A) is a block diagram illustrating the configuration of a master device, and (B) is a block diagram illustrating the configuration of a slave device. In FIG. 1, for convenience of explanation, it is illustrated that the master device has a transmission function and the slave device has a reception function only. However, both devices, in fact, have both functions.

The cordless telephone includes a master device (a first communication terminal) 10 that is a base unit illustrated in (A) of FIG. 1 and a plurality of slave devices (second communication terminals) 20 that are handsets illustrated in (B) of FIG. 1. The cordless telephone is a wireless communication system which establishes a digital link on a wireless channel between the master device 10 and the slave device 20, compresses a sound signal in an adaptive differential pulse code modulation method, carries the sound signal on a sound packet, and performs communication in a TDMA (Time Division Multiple Access)/TDD (Time Division Duplex) method. A codec adopts G.727 of ITU-T (International Telecommunication Union Telecommunication Standardization sector) standard.

The master device 10 includes a sound input unit 11, a PCM conversion unit 12, an ADPCM encoding unit 13, a transmission conversion table 14, a transmission conversion table switching unit 15, a transmission packet generation unit 16, and a wireless transmission circuit 17.

The sound input unit 11 inputs a sound signal from a signal from a telephone network or an IP network. Further, the sound input unit 11 may be a microphone if a handset is installed in the master device 10.

The PCM conversion unit 12 samples and quantizes the sound signal for each predetermined time, into a predetermined number of bits.

Figure 2:
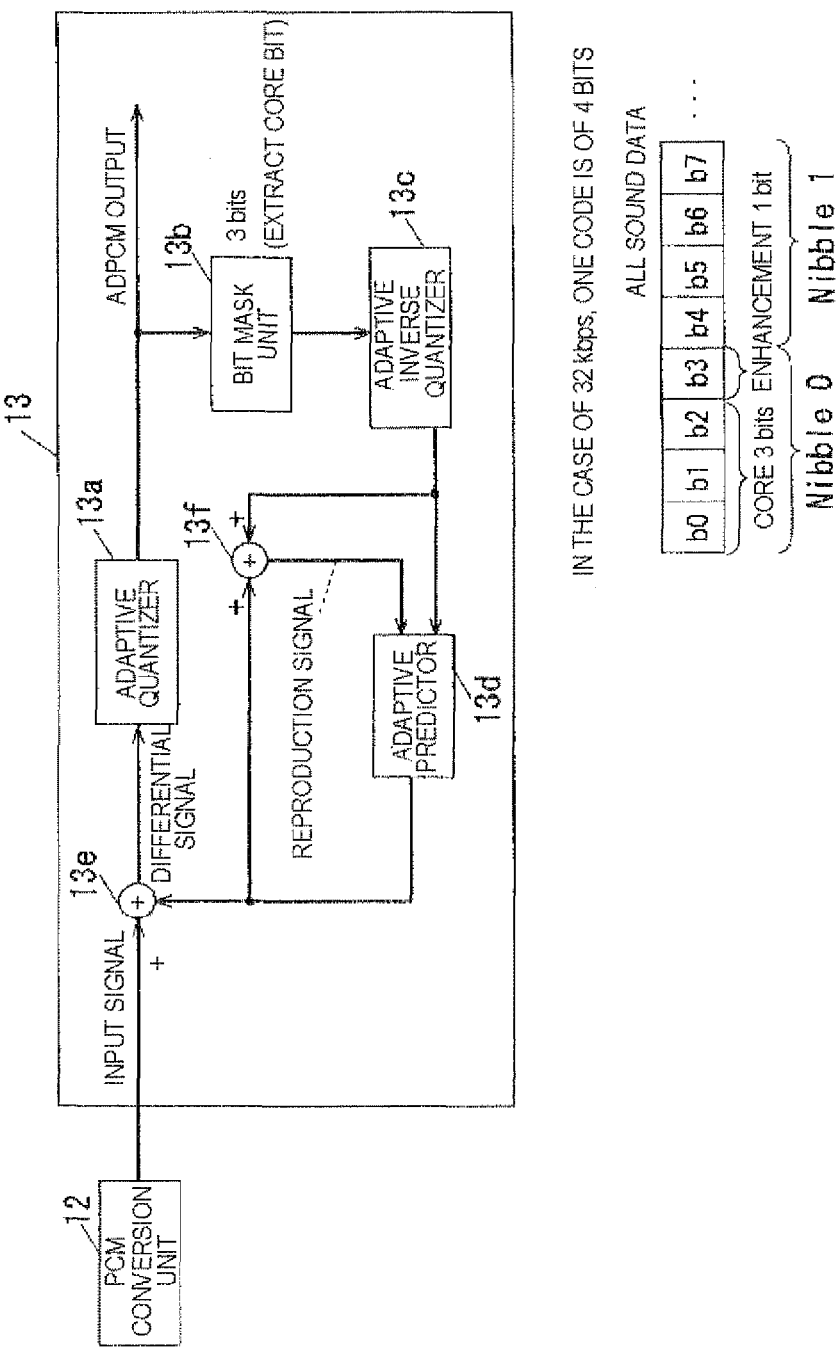
FIG. 2 is a diagram illustrating an ADPCM encoding unit.

The ADPCM encoding unit 13 generates digital sound data (hereinafter simply referred to as "sound data") by ADPCM (Adaptive Differential Pulse Code Modulation). Here, the ADPCM encoding unit 13 will be described based on FIG. 2. FIG. 2 is a diagram illustrating the configuration of the ADPCM encoding unit 13.

The ADPCM encoding unit 13 includes an adaptive quantizer 13a, a bit mask unit 13b, an adaptive inverse quantizer 13c, and an adaptive predictor 13d. The bit mask unit 13b extracts bits that are set as core bits from a 4-bit ADPCM code generated by the adaptive quantizer 13a. Here, upper three bits are set as the core bits. The adaptive inverse quantizer 13c calculates and outputs a differential signal that is quantized on the basis of the data of the core bits (three bits). The differential signal output from the adaptive inverse quantizer 13c is sent to the adaptive predictor 13d and an adder 13f. The adder 13f adds a prediction signal generated in the encoder to the differential signal and generates a reproduction signal. The adaptive predictor 13d generates the prediction signal based on the differential signal from the adaptive inverse quantizer 13c and the reproduction signal from the adder 13f. An adder 13e calculates a difference between an input signal from the PCM conversion unit 12 and the prediction signal from the adaptive predictor 13d, and the obtained differential signal is sent to the adaptive quantizer 13a, which generates an ADPCM code.

Figure 3:
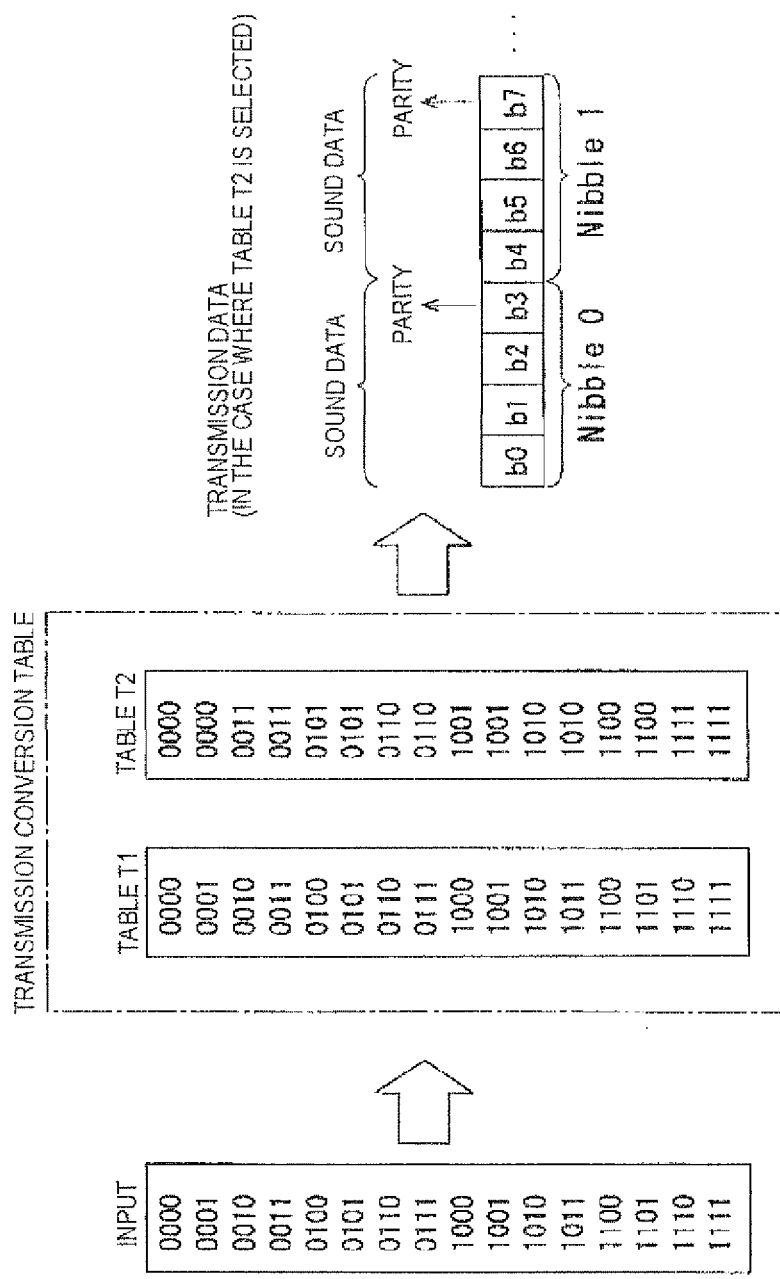
FIG. 3 is a diagram illustrating a transmission conversion table.

In this embodiment, since the data rate is 32 kbps, 4-bit sound data is generated by the ADPCM encoding unit 13 of the master device 10 as ADPCM data of which the most significant bit is a positive/negative code bit. Accordingly, the 4-bit ADPCM data becomes 0000 to 1111 as illustrated in FIG. 3. Since the ADPCM data indicates the difference between the data and the just previously digitized data, 0000 is the positive minimum value and 1111 is the negative minimum value. Further, 0111 is the positive maximum value and 1000 is the negative maximum value.

G.727 determines that the core bits are set to two bits or more. In this embodiment, three bits of the 4-bit ADPCM code are set as the core bits, and the remaining one bit is set to an enhancement bit. The ADPCM encoding unit 13 determines the upper three bits as the core bits, and the decoding unit on the reception side processes the upper three bits as the core bits. Once the number of core bits is coincidentally set in the encoder and the decoder, the prediction signal generated by the adaptive predictor 13*d* has the same value on the encoder side and the decoder side, and thus great deterioration of the sound quality can be avoided even if the enhancement bit is used for another purpose such as for data communication or the like.

In FIG. 1, the transmission conversion table 14 converts the 4-bit sound data output from the ADPCM encoding unit 13 into 4-bit transmission data that is to be transmitted to the slave device 20 and outputs the converted data. Here, the transmission conversion table 14 will be described in detail based on FIG. 3. FIG. 3 is a diagram illustrating the transmission conversion table 14.

The transmission conversion table 14 includes tables T1 and T2. The table T1 is configured so as to output the input sound data as it is, that is, as the same value. The table T2 is so configured that the upper three bits of the 4-bit data have the same values as their input values and the lower one bit becomes an even-numbered parity bit of the upper three bits. That is, by reversing the least significant bit so that the number of "1" of the 4 bits of the ADPCM sound data becomes an even number according to the number of "1" of the 4 bits, the lower one bit operates as a parity signal.

By performing the conversion in the table T2, the least significant bit b3 of 4 bits for one sample value of a column of the transmission sound data, for example, of 4 bits b0, b1, b2, and b3 illustrated in FIG. 3, becomes a parity bit, and the least significant bit b7 of the next 4 bits b4, b5, b6, and b7 becomes a parity bit.

In FIG. 1, the transmission conversion table switching unit 15 functions as the transmission side processing unit together with the transmission conversion table 14 by performing switching of two tables (tables T1 and T2) of the transmission conversion table 14 based on error information received from the slave device 20. Here, the transmission conversion table switching unit 15 will be described based on FIG. 4.

Figure 4:
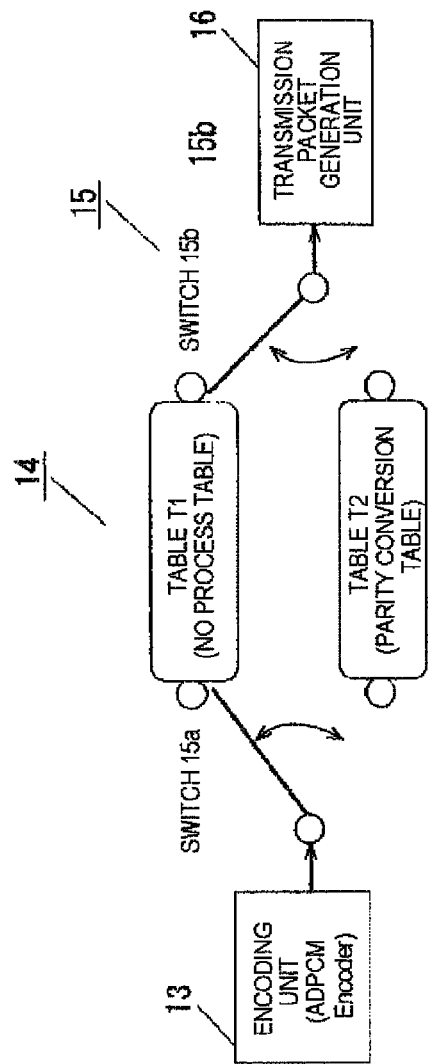
FIG. 4 is a diagram illustrating a transmission conversion table switching unit.

FIG. 4 is a diagram illustrating the configuration of the transmission conversion table switching unit 15. The transmission conversion table switching unit 15 performs switching of respective connections of the transmission conversion table 14, the ADPCM encoding unit 13, and the transmission packet generation unit 16 through switches 15*a* and 15*b*. In the case where a good communication environment is maintained and the transmission conversion is not required, the transmission conversion table switching unit 15 makes the switches 15*a* and 15*b* be switched to the side of the table T1. In the case where the communication environment is deteriorated and the transmission conversion is required, the transmission conversion table switching unit 15 converts the transmission data so that the least significant bit of the transmission data becomes the parity signal by making the switches 15*a* and 15*b* be switched to the side of the table T2.

Figure 5:
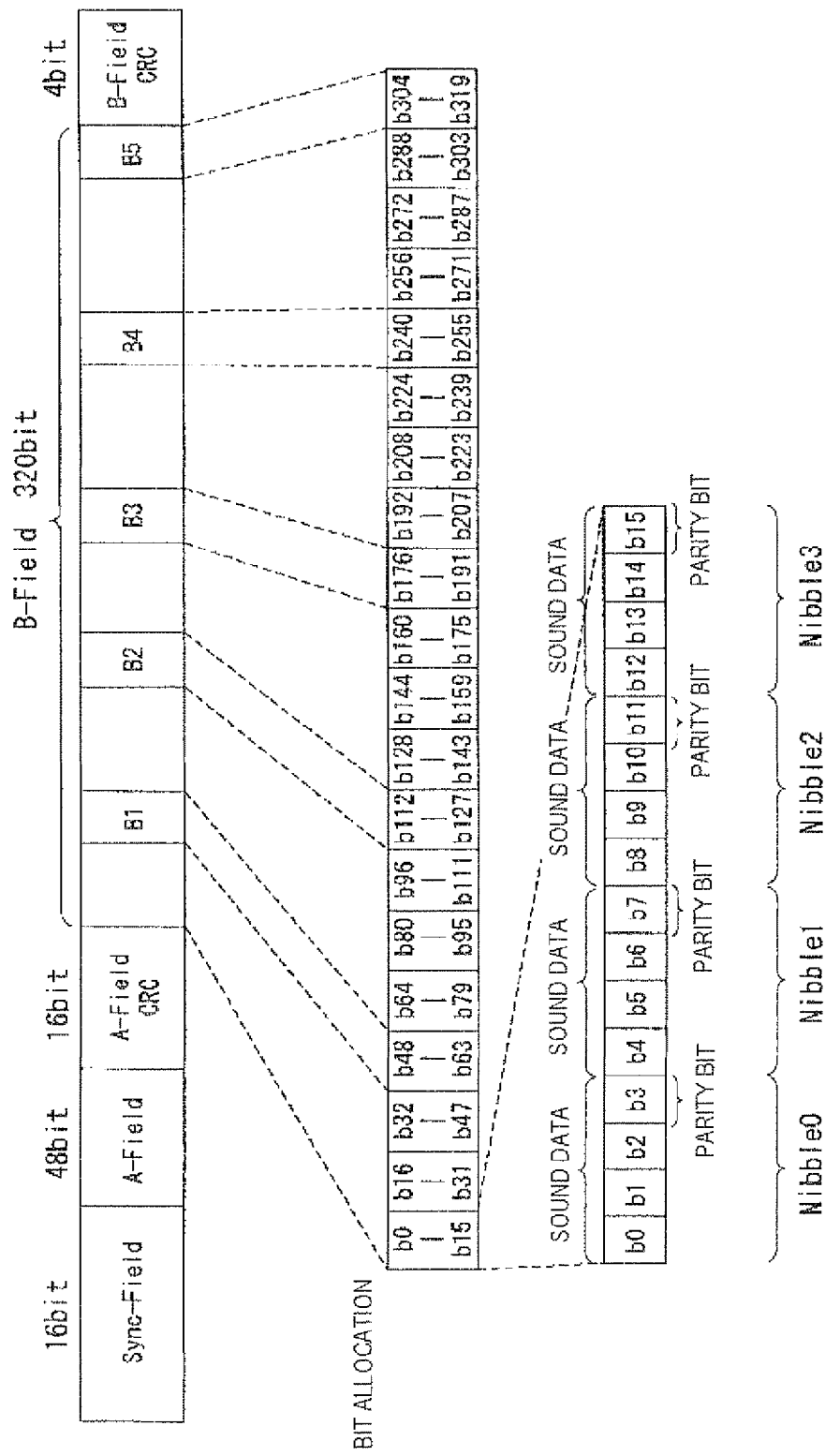
FIG. 5 is a diagram illustrating a format of a sound packet according to an embodiment of the invention.

In FIG. 1, the transmission packet generation unit 16 generates the sound packet by accumulating the sound data from the transmission conversion table 14 as long as 10 msec. The sound packet will be described based on FIG. 5. FIG. 5 is a diagram illustrating a format of a sound packet according to the embodiment of the invention.

The sound packet illustrated in FIG. 5 is composed of a Sync-field region (16 bits) for storing data (sync word) for synchronization, an A-field (48 bits) for storing data for a control signal, an A-field CRC (16 bits) for storing a CRC (Cyclic Redundancy Check) for the A-field, a B-field (320 bits) for storing sound data, and a B-field CRC (4 bits) for storing a CRC for the B-field. The CRC for the-B-field is not for the whole B-field, but is for only 80 bits including bit numbers of b48 to b63, b112 to b127, b176 to b191, b240 to b255, and b304 to b319. In this embodiment of the invention, data conversion is performed so that the least significant bit that is an enhancement bit of the 4-bit ADPCM sound data stored in the B-field serves as the parity bit. In the ADPCM data, all the 4 bits including the least significant bit are used as the sound data, and since the core bits (three bits) that are used to generate the prediction signal are used as they are without any change, the deterioration of the sound quality is low, and the phone call can be performed in a state where the sound quality is maintained to some extent.

The wireless transmission circuit 17 modulates the sound packet from the transmission packet generation unit 16, and functions as the transmission circuit unit that transmits a wireless signal through an antenna 17*a*.

In the master device 10 as described above, the data transmission means includes the transmission conversion table 14 for converting a part of the ADPCM sound data into the parity bit, the transmission packet generation unit 16 generating the sound packet including the converted sound data, and the wireless transmission circuit 17 transmitting the wireless signal to the slave device 20.

Next, the slave device 20 will be described based on (B) of FIG. 1. The slave device 20 includes a wireless reception circuit 21, a received packet processing unit 22, a reception conversion table 23, a reception error processing unit 24, a reception conversion table switching unit 25, an ADPCM decoding unit 26, a PCM conversion unit 27, a sound output unit 28, and a received electric field strength processing unit 29.

The wireless reception circuit 21 functions as a reception circuit unit which receives and demodulates the wireless signal received from the master device 10 through the antenna 21*a*, and outputs a sound packet to the received packet processing unit 22. Further, the wireless reception circuit 21 measures the RSSI (Received Signal Strength Indicator) of the received sound packet and outputs the measured RSSI to the received electric field strength processing unit 29.

The received packet processing unit 22 detects a sync error in the case where a predetermined sync word is not obtained, a CRC error for the A-field or B-field, and a parity error to notify the reception error processing unit 24 of the detected errors, or extracts the sound data to output the sound data to the reception conversion table 23.

The reception conversion table 23 converts the 4-bit sound data received from the master device 10 to output the converted data. Here, the reception conversion table 23 will be described in detail based on FIG. 6. FIG. 6 is a diagram illustrating the reception conversion table 23.

The reception conversion table 23 is composed of tables R1 to R4. The table R1 is configured to output the input sound data as it is, that is, as the same value.

The table R2 is configured to replace the sound data with the mute data in the case where the error has occurred as a result of the parity check of the 4-bit sound data. Since the side of the master device 10 has the lower one bit that serves as the parity bit according to the rule of even-numbered parity, it identifies the occurrence of the parity error by the number of "1" of the entire 4 bits including three bits in addition to the lower one bit. That is, if the number of "1" is an odd number such as "0001" "0010", "0111", and the like, it means the parity error.

The conversion by the table R2 of the reception conversion table 23 is performed in a manner such that if the parity error has not occurred, the sound data is output as it is, while if the parity error has occurred (if the number of "1" of the 4-bit received data is an odd number), the sound data is converted into the mute data. In this embodiment of the invention, "1111" which is recommended in G.726 and is the negative minimum value is determined as the mute data. When the parity error has occurred as described above, the reception conversion table 23 suppresses the influence on the reproduction sound by converting the sound data in which the error has occurred into the mute data. In this case, the mute data is not limited to "1111", and other mute data may be used.

In addition to the conversion of the data in which the parity error has converted into the mute data in the same manner as the table R2, the table R3 subtracts "1" from the data in which the parity error has not occurred if the upper one bit of the received data is "0", while the table R3 replaces the received data with the sound data that attenuates the sound by adding "1" to the data if the upper one bit of the received data is "1". In an example of FIG. 6, in the case where the parity error has not occurred and the upper one bit is "0", that is, in the case of "001", "0101", and "0110", the table R3 converts "0011", "0101", and "0110" into "0010", "0100", and "0101" by subtracting "1" from "0011", "0101", and "0110", respectively. In the case where the parity error has not occurred and the upper one bit is "1", that is, in the case of "1001", "1010", and "1100", the table R3 converts "1001", "1010", and "1100" into "1010", "1011", and "1101" by adding "1" to "1001", "1010", and "1100", respectively.

The table R4 is configured to replace all the bits of the received data into the mute data "1111" regardless of the occurrence of the parity error.

In (B) of FIG. 1, the reception error processing unit 24 is error determination means having a counter (the details thereof will be described later) which counts up when a reception error, such as a sync error detected by the received packet processing unit 22, an A-field error, a B-field error, or the like, occurs, and counts down when the reception error does not occur. The value of the counter is sent to the reception conversion table switching unit 25, and the reception conversion table 23 is switched according to the value of the counter.

Figure 7:
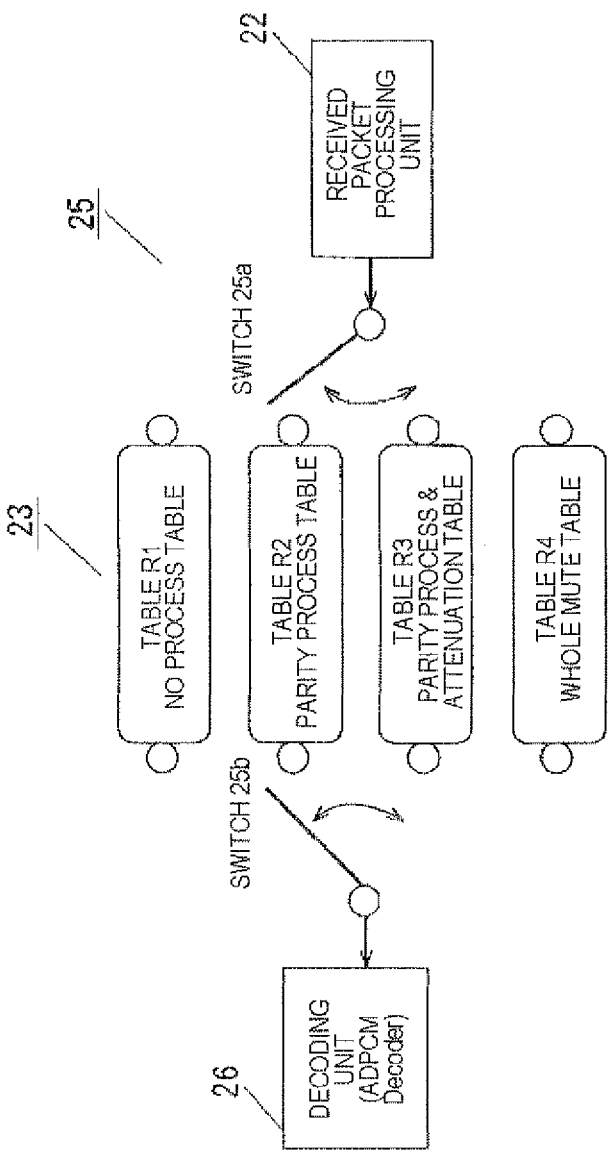
FIG. 7 is a diagram illustrating a reception conversion table switching unit.

The reception conversion table switching unit 25 functions as the data conversion means (reception side processing unit) together with the reception conversion table 23 by performing switching of four tables (tables R1 to R4) of the reception conversion table 23 based on an instruction of the reception error processing unit 24 from the slave device 20 or a received electric field strength signal from the received electric field strength processing unit 29. Here, the reception conversion table switching unit 25 will be described based on FIG. 7. FIG. 7 is a diagram illustrating the reception conversion table switching unit 25.

The reception conversion table switching unit 25 performs switching of the tables R1 to R4 of the reception conversion table 23 to be used through switches 25a and 25b. For example, in the case where the conversion processing is not performed, the reception conversion table switching unit 25 makes the received packet processing unit 22 and the ADPCM decoding unit 26 be switched to the table R1, while in the case of performing the parity process, the reception conversion table switching unit 25 makes the received packet processing unit 22 and the ADPCM decoding unit 26 be switched to the table R2. Further, in the case of performing the parity process and an attenuation process, the reception conversion table switching unit 25 makes the received packet processing unit 22 and the ADPCM decoding unit 26 be switched to the table R3.

Figure 8:
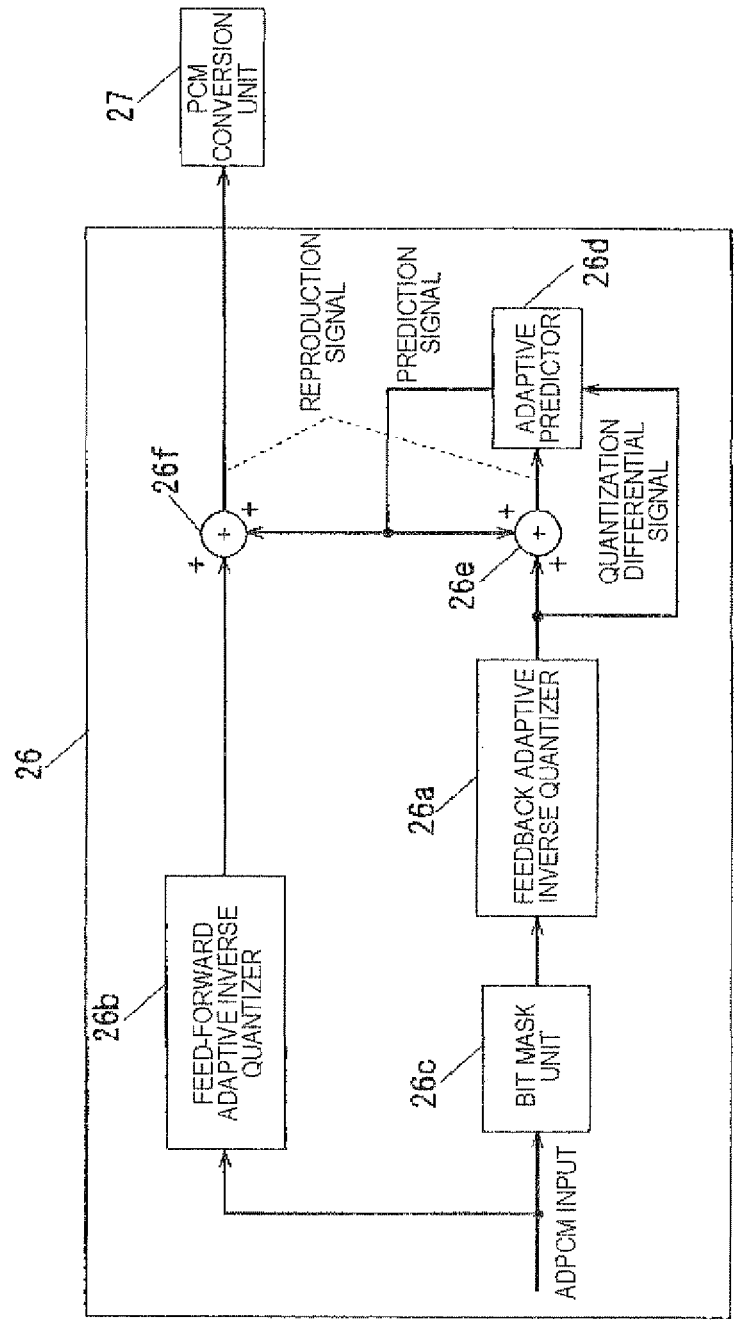
FIG. 8 is a diagram illustrating an ADPCM decoding unit.

The ADPCM decoding unit 26 decodes the 4-bit sound data from the reception conversion table 23. That is, the ADPCM decoding unit 26 decodes all the 4 bits including a parity bit of a lower one bit, mute data, and the like, as the sound data. Here, the ADPCM decoding unit 26 will be described based on FIG. 8. FIG. 8 is a diagram illustrating the ADPCM decoding unit 26.

The ADPCM decoding unit 26 includes a feedback adaptive inverse quantizer 26a, a feed-forward adaptive inverse quantizer 26b, a bit mask unit 26c, and an adaptive predictor 26d. A core bit is extracted from an ADPCM code input by the bit mask unit 26c, and only the extracted core bit is input to the feedback adaptive inverse quantizer 26a. The feedback adaptive inverse quantizer 26a calculates and outputs a quantized differential signal. The output quantized differential signal is added to the prediction signal by an adder 26e, and is input to the adaptive predictor 26d, which generates the prediction signal.

The feed-forward adaptive inverse quantizer 26b calculates the quantized differential signal using the bits of the entire ADPCM to output the quantized differential signal. In the case where the sound data is of 32 kbps, it becomes the 4-bit ADPCM code input. The prediction signal calculated from the core bit only and the quantized differential signal calculated from all the 4 bits are added by an adder 26f to output a reproduction signal.

In (B) of FIG. 1, the PCM conversion unit 27 generates an analog sound signal from the reproduction signal. The sound output unit 28 may be a speaker that reproduces the sound signal.

The received electric field strength processing unit 29 functions as the received electric field strength level determination means that determines the change of the received electric field strength measured by the wireless reception circuit 21 and outputs the result of the determination to the reception conversion table switching unit 25. This determination is made in a manner such that, in the case where the master device 10 and the slave device 20 are spaced apart from each other, the received electric field strength is lowered, and if the received electric field strength is lower than a threshold value A (a first threshold value), the communication environment is inferior. Further, in the case where the master device 10 and the slave device 20 are close to each other, the communication environment becomes good and the received electric field strength is elevated. If the received electric field strength exceeds a threshold value B (a second threshold value), the communication environment becomes good. However, in determination, the threshold value B is set to be higher than the threshold value A.

The received electric field strength processing unit 29 outputs information on the communication environment to the reception conversion table switching unit 25, and the reception conversion table switching unit 25 selects the table R1 that does not perform the parity check if the communication environment is good. Further, if the communication environment is inferior, the reception conversion table switching unit 25 performs the parity check (the transmission side: table T2), the reception side selects any one of other tables (tables R2 to R4) to be sound-processed. The received electric field strength processing unit 29 performs the synchronization between the master device 10 and the conversion table by transferring the determination result information that is obtained by determining the change of the received electric field strength to the master device 10 using a control packet.

By setting the threshold value B to be larger than the threshold value A, switching is performed from the table R1 in which the parity check is not performed to the tables R2 to R4 in which the parity check is performed and the sound process is performed when the communication environment is deteriorated, and even if the communication environment becomes good thereafter, the switching is not performed at the same electric field strength as that switched by the reception conversion table 23. Since the parity check is stopped after the communication environment reaches a sufficiently good level, the reception conversion table 23 and the transmission conversion table 14 are prevented from being frequently switched.

A communication method of the cordless telephone as configured above according to the embodiment of the invention will be described based on the drawings. First, in communication between the master device 10 and the slave device 20, a case where the communication environment is good and no reception error occurs will be described. In this case, it is assumed that the table T1 illustrated in FIG. 3 is selected in the transmission conversion table 14, and the table R1 illustrated in FIG. 6 is selected in the reception conversion table 23.

The sound signal from the sound input unit 11 is quantized by the PCM conversion unit 12, and one code is compressed into 4-bit sound data through ADPCM by the ADPCM encoding unit 13.

This 4-bit sound data is input to the table T1 of the transmission conversion table 14, and then the sound data having the same value as the input is output from the table T1 as the transmission data. The sound data output from the transmission conversion table 14 is included in the sound packet by the transmission packet generation unit 16, and is transmitted to the slave device 20 through the antenna 17a by the wireless transmission circuit 17 as the wireless signal.

In the slave device 20, the wireless signal from the master device 10 is received in the wireless reception circuit 21 through the antenna 21a. The wireless signal received in the wireless reception circuit 21 is demodulated and output to the received packet processing unit 22 as the sound packet.

The received packet processing unit 22 checks the occurrence of the reception error of the sound packet, extracts the 4-bit sound data included in the sound packet, and outputs the extracted sound data to the reception conversion table 23.

If the sound data is input to the table R1 of the reception conversion table 23, 4-bit sound data having the same value as the input is output from the table T1. The sound data output from the reception conversion table 23 is input to and expanded by the ADPCM decoding unit 26, converted into a sound signal by the PCM conversion unit 27, and is reproduced by the sound output unit 28.

In this case, since the master device 10 that is the transmission side transmits the sound to the slave device 20 as it is without processing all the 4-bit ADPCM sound data, high-quality sound can be transmitted.

Next, a case where the slave device 20 detects the reception error will be described.

If the received packet processing unit 22 of the slave device 20 detects the reception error such as a sync error or a CRC error, it transmits reception error information regarding the effect that the reception error has occurred to the master device 10 using a transmission function (not illustrated). The master device 10 can recognize that the communication environment is deteriorated through the notification of the reception error information. Accordingly, the transmission conversion table switching unit 15 performs switching of the connections of the transmission conversion table 14 with the ADPCM encoding unit 13 and the transmission packet generation unit 16 from the table T1 to the table T2. By doing so, the least significant bit of the 4-bit sound data is converted into the parity bit (see FIG. 3). The parity bit generation using the transmission conversion table 14 is simpler than the parity bit calculation through operation.

The slave device 20, in synchronization with the notification of the reception error to the master device 10, instructs the reception conversion table switching unit 25 to perform switching of the reception conversion table from the table R1 to the table R2 (see FIG. 6). As described above, the conversion by the table R2 is performed in a manner such that the sound data is output as it is if the parity error has not occurred, and the sound data is converted into the mute data if the parity error has occurred.

Figure 9:
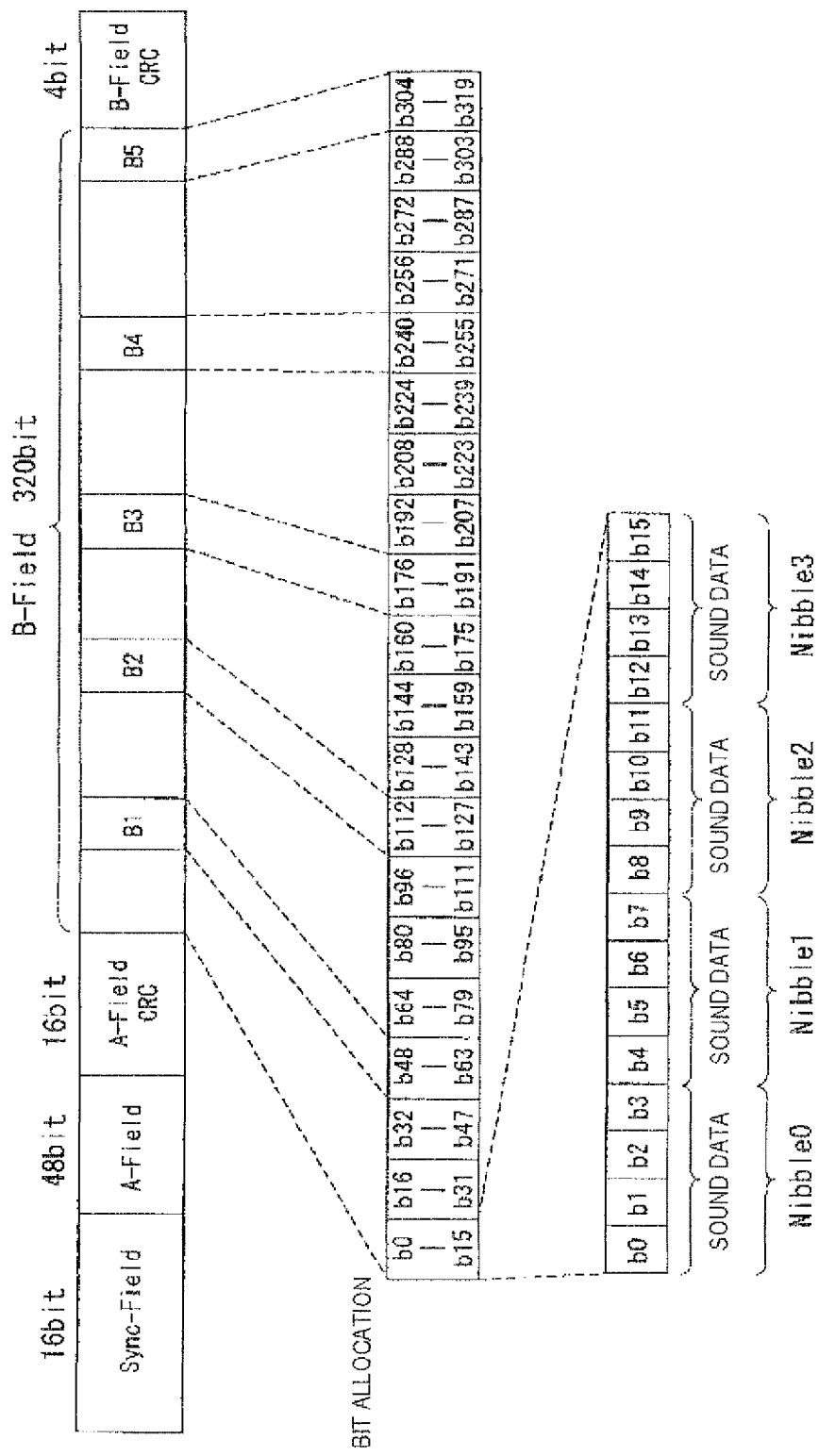
FIG. 9 is a diagram illustrating a format of a sound packet in the related art.
Figure 10:
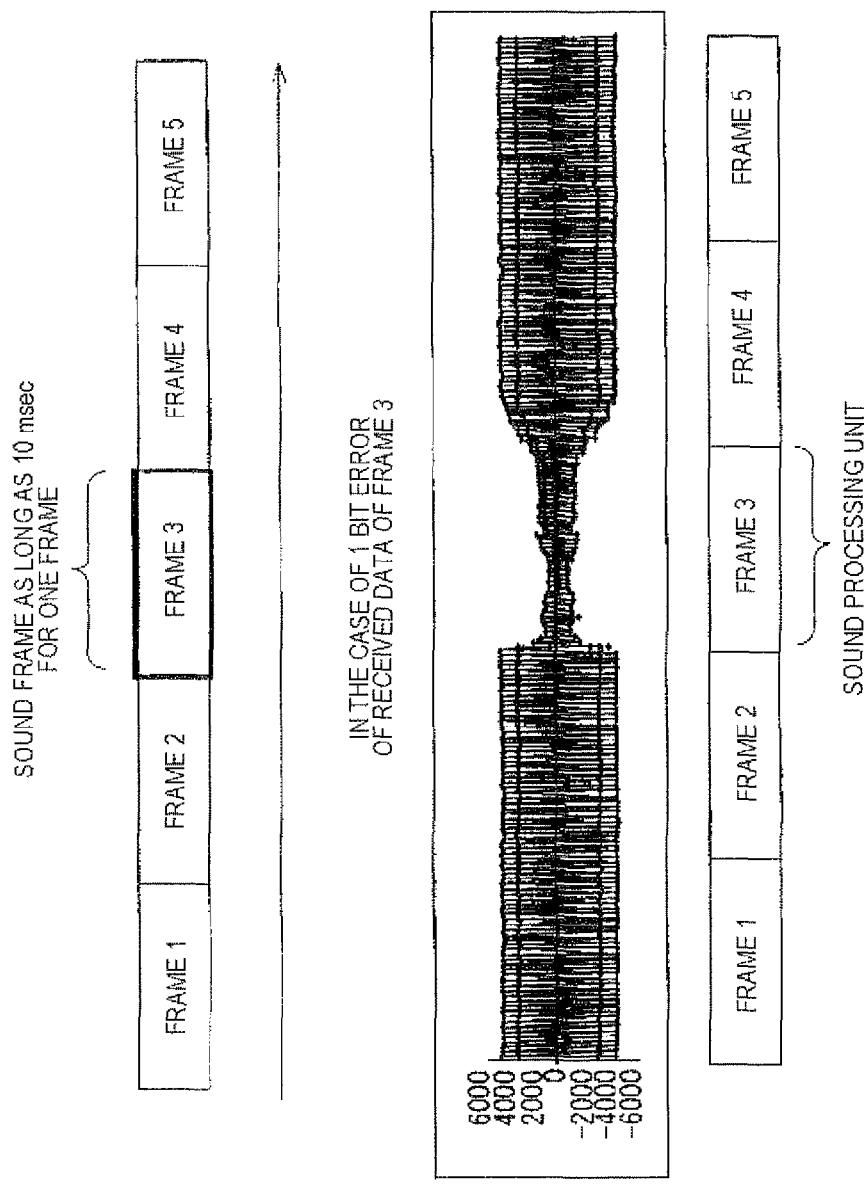
FIG. 10 is a diagram illustrating sound processing in a sound packet in the related art.
Figure 11:
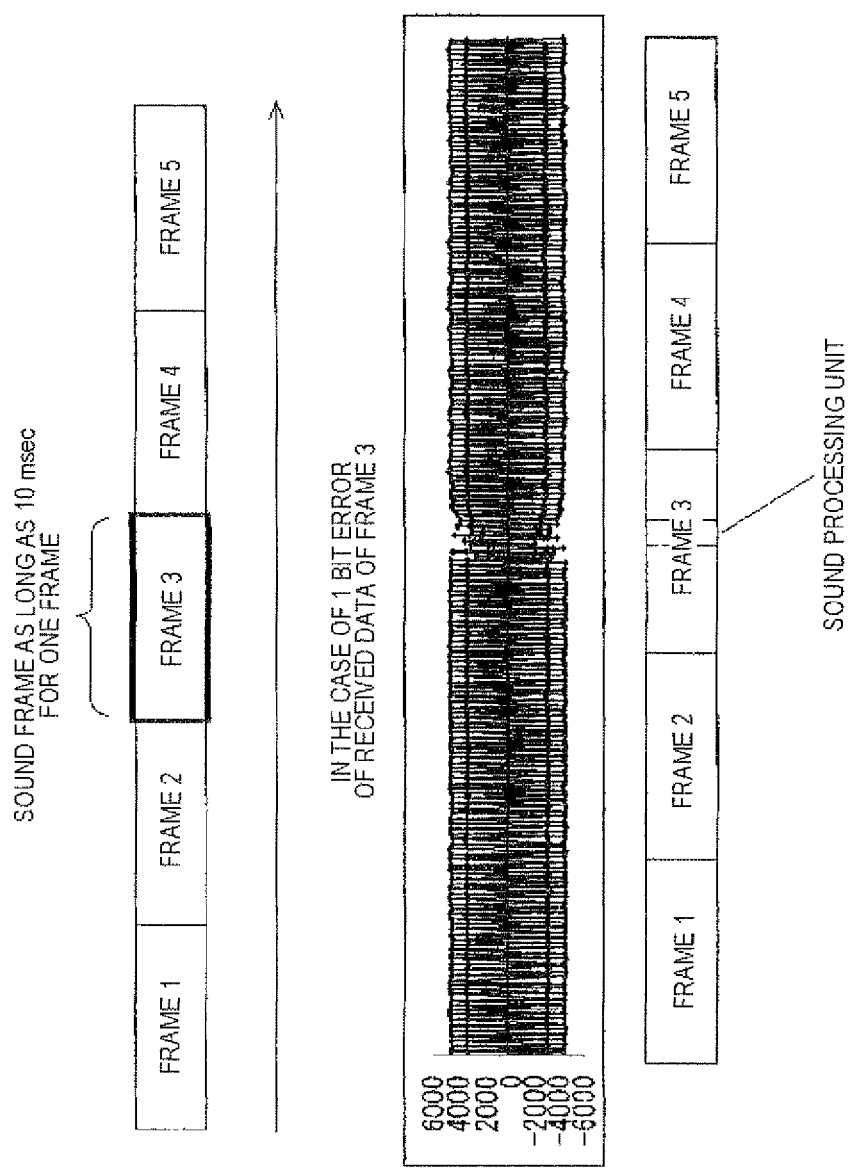
FIG. 11 is a diagram illustrating sound processing in a sound packet according to an embodiment of the invention.

Next, the influence on the sound packet in the related art and the influence on the sound of the sound packet according to the embodiment of the invention will be described based on FIGS. 9 to 11. FIG. 9 is a diagram illustrating a format of a sound packet in the related art, and FIG. 10 is a diagram illustrating sound processing in a sound packet in the related art. FIG. 11 is a diagram illustrating sound processing in a sound packet according to the embodiment of the invention.

In the sound packet in the related art as illustrated in FIG. 9, since a CRC of a B-field is added to 16-bit sound data that is distributed in 5 places in the B-field, sound data that is not the subject of the CRC is present, and the reception error for all the sound data may not be detected. Accordingly, even in the case where not only the CRC error of the B-field but also the error of data for synchronization and the CRC error (CRC error of an A-field) added to data for a control signal are detected, it is necessary to perform the sound process such as mute with respect to the entire one frame on the assumption that there is a high possibility that the error has occurred even in the sound data that is not the subject of the CRC of the B-field. As illustrated in FIG. 10, sound data of about 10 msec is included in one frame, and if the sound data for one frame is processed, it exerts a great influence on the sound.

In the sound packet according to the embodiment of the invention, one-bit parity bit is included in the 4-bit sound data, and thus the error can be detected every 4 bits. Accordingly, as illustrated in FIG. 11, by converting only the sound data in which the parity error has occurred into the mute data, it is not required to perform the sound process with respect to the whole one frame, and since the influence range corresponds to only the replaced sound data, it exerts a low influence on the sound.

The sound data output from the reception conversion table 23 is input to and expanded by the ADPCM decoding unit 26, converted into a sound signal by the PCM conversion unit 27, and is reproduced by the sound output unit 28. In reproducing the sound, since the least significant bit is used as the parity bit while the data rate is maintained, the sound quality is somewhat deteriorated in comparison to the case where all the 4 bits are used as the sound data, but high sound quality can be secured in comparison to the case where sound data for one frame is processed in a state of the sync word error or the CRC error due to the deterioration of the communication environment.

Figure 12:
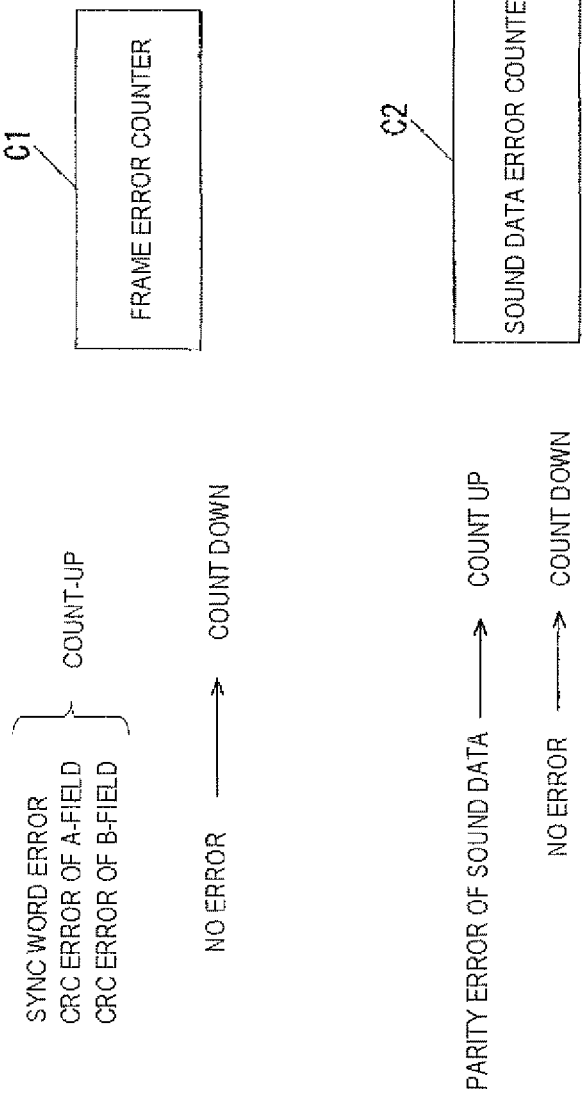
In FIG. 12, (A) and (B) are diagrams illustrating a counter installed in a reception error processing unit.
Figure 13:
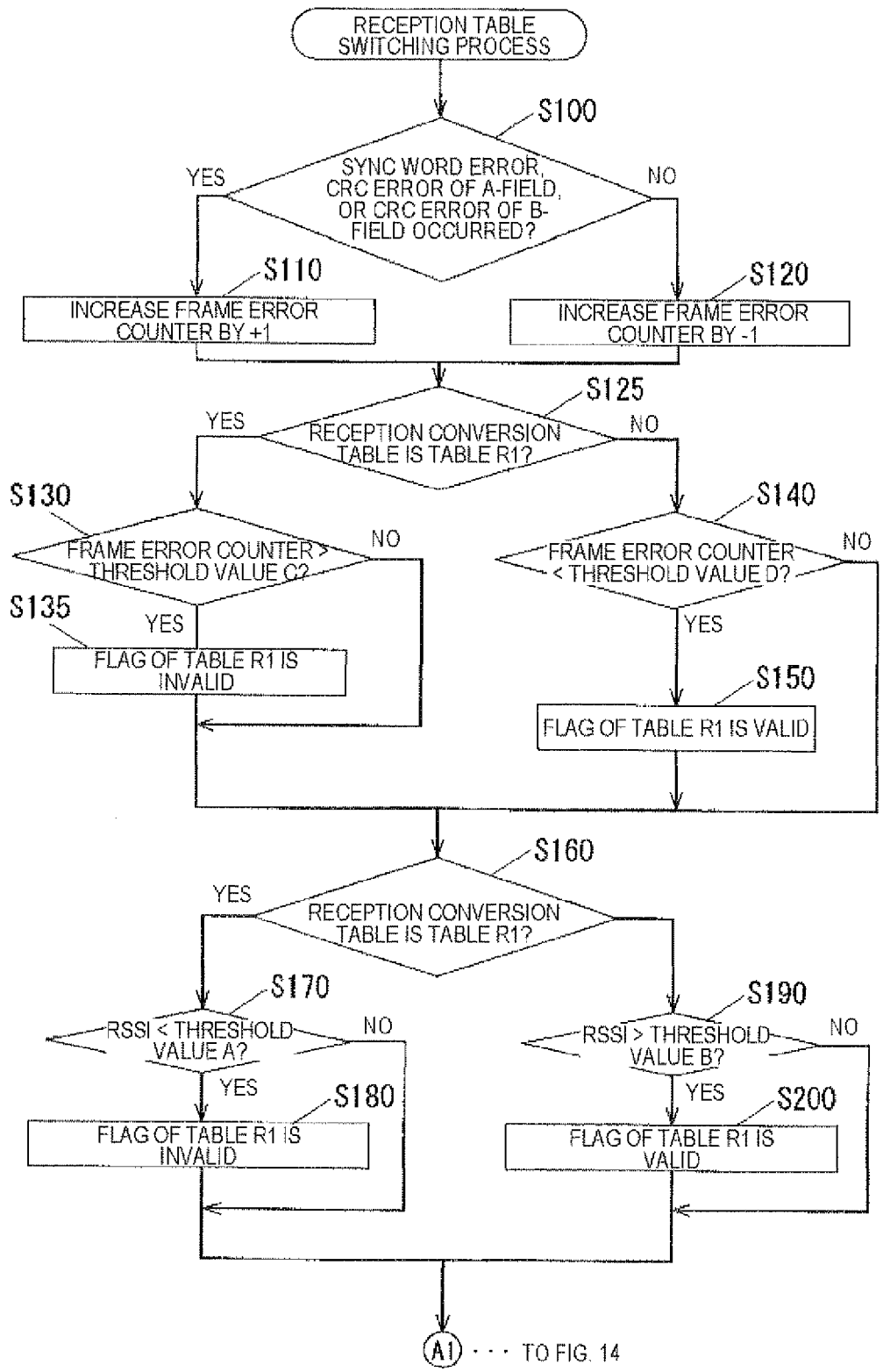
FIG. 13 is a flowchart illustrating a reception conversion table switching process.
Figure 14:
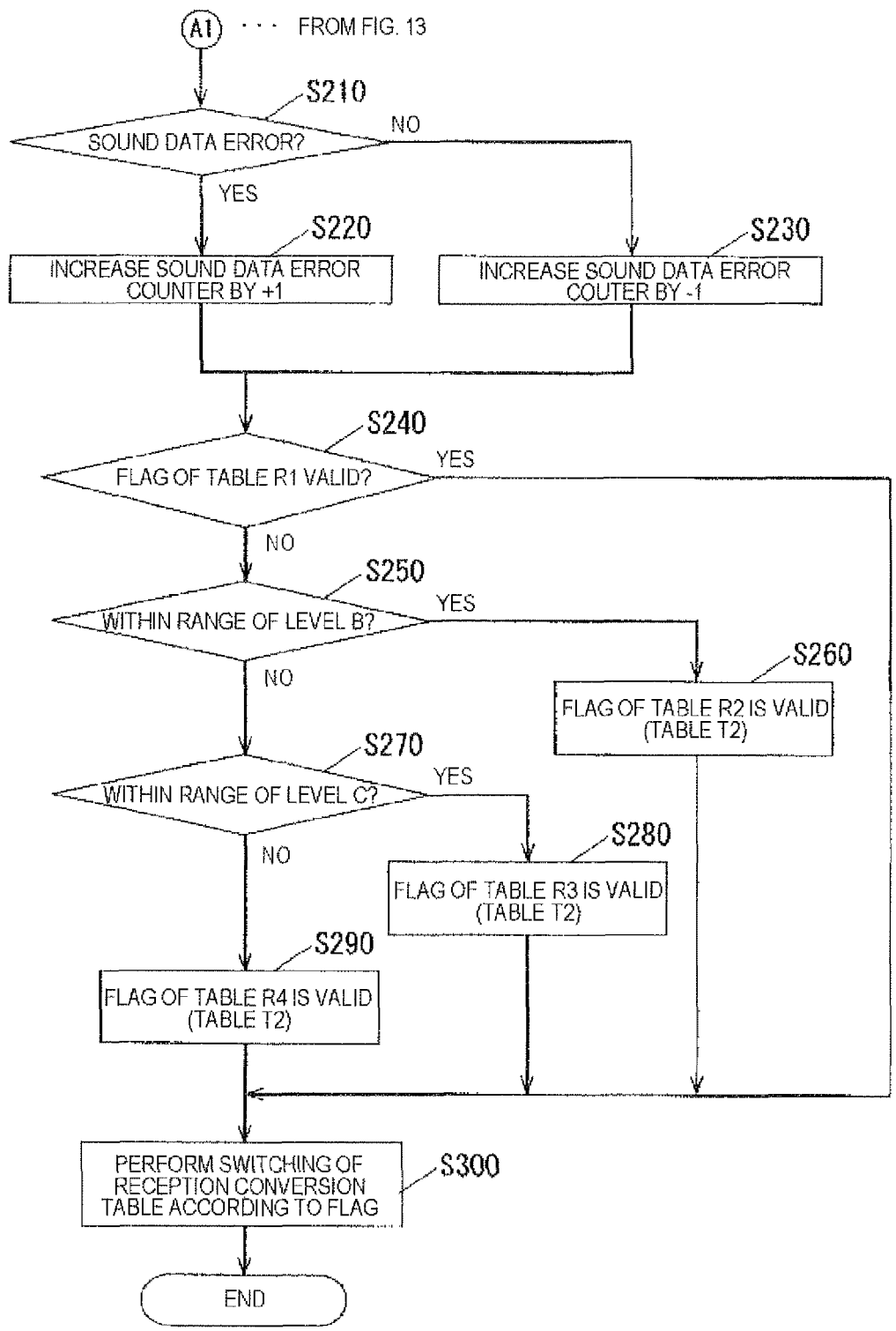
FIG. 14 is a flowchart illustrating a reception conversion table switching process continuously performed from FIG. 13.
Figure 15:
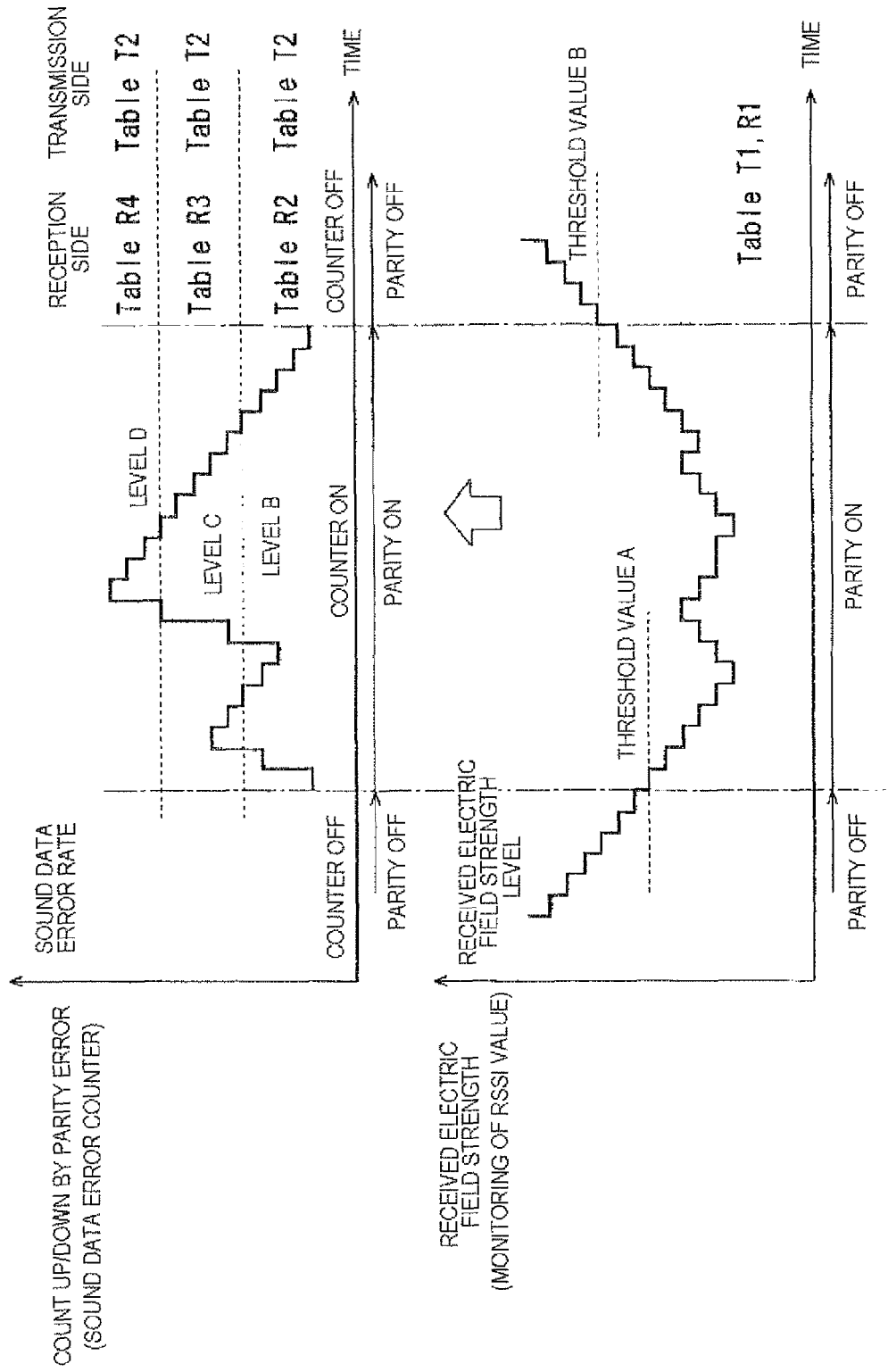
FIG. 15 is a diagram illustrating a reception conversion table switching process that is determined by received electric field strength.
Figure 16:
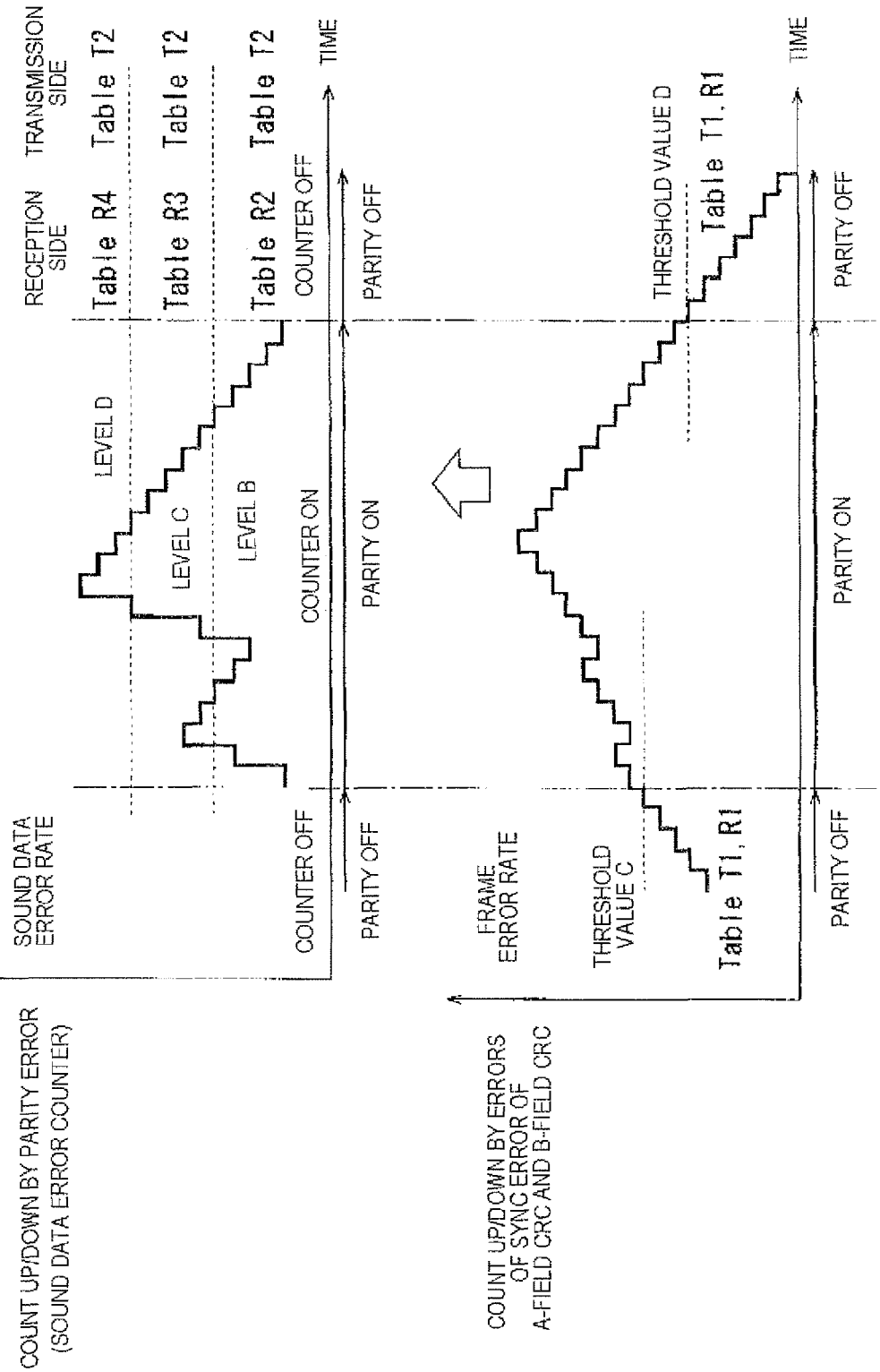
FIG. 16 is a diagram illustrating a reception conversion table switching process that is determined by a frame error counter.

Next, a method of switching transmission and reception conversion tables that is performed by the reception error processing unit 24 will be described based on FIGS. 12 to 16. In FIG. 12, (A) and (B) are diagrams illustrating a counter installed in the reception error processing unit 24. In FIG. 12, (A) is a diagram illustrating a frame error counter, and (B) is a diagram illustrating a sound data error counter. FIG. 13 is a flowchart illustrating a reception conversion table switching process, and FIG. 14 is a flowchart illustrating a reception conversion table switching process continuously performed from FIG. 13. FIG. 15 is a diagram illustrating a reception conversion table switching process that is determined by the received electric field strength, and FIG. 16 is a diagram illustrating a reception conversion table switching process that is determined by a frame error counter.

The reception error processing unit 24 has two counters that count number according to the contents of error notification from the received packet processing unit 22. These counters, as illustrated in FIG. 12, include a frame error counter C1 that counts up by the sync word error, A-field CRC error, or B-field CRC error and counts down by no error, and a sound data error counter C2 that counts up when the 4-bit sound data is the parity error and counts down by no error. In this embodiment of the invention, count-up corresponds to +1 and count-down corresponds to −1. However, the count-up/down may be set to have different values in order to change the weight. It is possible to appropriately determine these values according to the communication environment where the cordless telephone is installed.

As illustrated in FIG. 13, the reception error processing unit 24 determines whether or not the frame system error, such as the sync word error, A-field CRC error, or B-field CRC error, has occurred in the received packet processing unit 22 (S100). If the error has occurred, the reception error processing unit 24 increases the frame error counter C1 by +1 (S110), while if the error has not occurred, the reception error processing unit 24 increases the frame error counter C1 by −1 (S120).

Next, the reception error processing unit 24 determines whether or not the reception conversion table 23 that is currently used is the table R1 (S125). If the reception conversion table 23 is the table R1, the reception error processing unit 24 determines whether or not the frame error counter value is equal to or larger than a threshold value C (S130). If the frame error counter value is equal to or larger than the threshold value C, the reception error processing unit 24 invalidates a flag of the table R1 (S135). That is, as illustrated in FIG. 16, since the error is increased due to an interference radio wave or the like, the reception error processing unit 24 invalidates the flag of the table R1, and performs switching of the reception conversion table 23 from the table R1 that does not perform the parity check to the tables R2 to R4 that perform the parity check or the sound processing. By doing so, the reception error processing unit 24 can detect the error of the sound data that occurs according to the deterioration of the communication environment at high accuracy. If the frame error counter value is smaller than the threshold value C in S130, the table R1 of the reception conversion table 23 is used as the current state, and the flag of the table R1 is in a valid state.

Further, if it is determined that the reception conversion table 23 that is currently used is not the table R1 in S125 as illustrated in FIG. 13, the reception error processing unit 24 determines whether or not the frame error counter value is smaller than a threshold value D (S140). If the frame error counter value is smaller than the threshold value D, the reception error processing unit 24 validates the flag of the table R1 (S150). That is, as illustrated in FIG. 16, in the case where no error has occurred due to the nonexistence of the interference radio wave, the reception error processing unit 24 validates the flag of the table R1, and performs switching of the reception conversion table 23 from the tables R2 to R4 that perform the parity check or the sound processing to the table R1 that does not perform the parity check. By doing so, the communication environment becomes good, and thus communication of the sound data can be performed with a better sound quality. If the frame error counter value is not smaller than the threshold value D in S140, the tables R2 to R4 of the reception conversion table 23 are used as the current state, and the flag of the table R1 is in an invalid state.

Next, the received electric field strength processing unit 29 determines whether or not the reception conversion table 23 currently used is the table R1 (S160). If the reception conversion table 23 is the table R1, the received electric field strength processing unit 29 determines whether or not the received electric field strength measured by the wireless reception circuit 21 is lower than the threshold value A (S170). If the received electric field strength is lower than the threshold value A, the received electric field strength processing unit 29 invalidates the flag of the table R1 (S180). That is, as illustrated in FIG. 15, since the received electric field strength is lower than the threshold value A due to the long distance between the master device 10 and the slave device 20 or the like, the received electric field strength processing unit 29 invalidates the flag of the table R1, and performs the switching of the reception conversion table 23 from the table R1 that does not perform the parity check to the tables R2 to R4 that perform the parity check or the sound processing. By doing so, the received electric field strength processing unit 29 can detect the error of the sound data that occurs according to the deterioration of the communication environment at high accuracy. If the received electric field strength is not smaller than the threshold value A in S170, the table R1 of the reception conversion table 23 is used as the current state, and the flag of the table R1 is in a valid state.

Further, if it is determined that the reception conversion table 23 currently used is not the table R1, the received electric field strength processing unit 29 determines whether or not the received electric field strength is equal to or higher than the threshold value B (S190). If the received electric field strength is equal to or higher than the threshold value B, the received electric field strength processing unit 29 validates the flag of the table R1 (S200). That is, as illustrated in FIG. 15, since the received electric field strength is equal to or higher than the threshold value B due to the short distance between the master device 10 and the slave device 20 or the like, the received electric field strength processing unit 29 validates the flag of the table R1, and performs the switching of the reception conversion table 23 from the tables R2 to R4 that perform the parity check or the sound processing to the table R1 that does not perform the parity check. By doing so, the communication environment becomes good, and thus communication of the sound data can be performed with a better sound quality. If the received electric field strength is smaller than the threshold value B in S190, the tables R2 to R4 of the reception conversion table 23 are used as the current state, and the flag of the table R1 is in an invalid state.

Next, as illustrated in FIG. 14, the reception error processing unit 24 determines whether or not the sound data error that is the parity error of the sound data has occurred (S210). If the error has occurred, the reception error processing unit 24 increases the sound data error counter C2 by +1 (S220), while if the error has not occurred, the reception error processing unit 24 increases the sound data error counter C2 by −1 (S230).

Next, the reception error processing unit 24 determines whether or not the flag of the table R1 is valid (S240). If the flag of the table R1 is valid, it means that the frame error rate is low and the communication environment is good, and thus regardless of the count value of the sound data error counter C2, the side of the master device 10 is switched to the table T1 and the side of the slave device 20 proceeds to S300 to be switched to the table R1.

Next, the reception error processing unit 24 determines whether or not the sound data error counter C2 is within a range of the level B (S250). This level B is in a range where the frame system error rate has been elevated, but the sound data error rate is determined to be still low. Accordingly, in order to perform the parity check of the sound data, the reception conversion table 23 validates the flag of the table R2 that selects the table R2 (S260), and then proceeds to S300.

If the sound data error counter C2 is not within the range of the level B, the reception error processing unit 24 then determines whether or not the sound data error counter C2 is within the range of the level C (S270). This level C is in a range where it is determined that the sound data error rate has been gradually elevated. Accordingly, the reception error processing unit 24 validates the flag of the table R3, which selects the table R3 that not only replaces the sound data with the mute data in the case where the parity error of the sound data has occurred but also replaces the sound data with the sound data that attenuates the sound even in the case where the parity error has not occurred (S280), and then proceeds to S300.

If the sound data error counter C2 is not within the range of the level C, it means that the sound data error counter C2 is within the level D, and the reception error processing unit 24 validates the flag of the table R4. This level D is in the range where the communication environment is worst. Accordingly, the table R4 which replaces all the sound data with the mute data is selected in the reception conversion table 23 (S290).

In S300, the reception error processing unit 24 performs the switching of the reception conversion table 23 according to the flag. For example, if the flag of the table R1 is valid, the reception error processing unit 24 instructs the reception conversion table switching unit 25 to perform switching of the reception conversion table 23 to the table R1. Further, the reception error processing unit 24 transmits a control packet to the master device 10 so that the master device 10 switches the transmission conversion table 14 to the table T1.

Further, if any one of flags of the tables R2 to R4 is valid, the reception error processing unit 24 instructs the reception conversion table switching unit 25 to perform switching of the reception conversion table 23 to any one of the tables R2 to R4. Further, the reception error processing unit 24 notifies the master device 10 of the error information, and instructs the master device 10 to perform switching of the transmission conversion table 14 to the table T2.

As described above, since the reception error processing unit 24 determines the increase/decrease of the error rate by adding the frame system error, such as the sync word error, the Afield CRC error, or the B-field CRC error, to the parity error of the sound data, it can cope with the occurrence of the error with higher accuracy.

Further, if it is determined that the error has occurred by the parity bit value of the sound data, the reception error processing unit 24 makes the sound data error counter C2 count up, while if it is determined that the error has not occurred, the reception error processing unit 24 makes the sound data error counter C2 count down. By increasing/decreasing the error rate by the sound data error counter C2, the reception error processing unit 24 can cope with the communication environment in which the reception level is deteriorated or becomes good.

Further, in the table R2 of the reception conversion table 23, the sound data in which the parity error has occurred is converted into the mute data. However, a click noise may occur depending on the sound data. Accordingly, by performing switching of the reception conversion table 23 to the table R3, the sound data for which the error does not occur in the same frame is converted so that the sound is attenuated, and thus the influence of the click noise can be suppressed.

Further, in the case where the communication environment is further deteriorated, by performing switching of the reception conversion table 23, which converts the whole sound data in the same frame into the mute data, to the table R4, the click noise can be suppressed more effectively.

As described above, although the embodiments of the invention have been described, the present invention is not limited to the above-described embodiments. For example, in this embodiment, since the data rate is of 32 kbps, the sound data is of 4 bits. However, even though the sound data is of 5 bits at the data rate of 40 kbps or the sound data is of three bits at the data rate of 24 kbps, it is possible to adopt the sound data so far as the master device 10 and the slave device 20 have the same data rate. Further, in addition to one parity bit, plural bits may be included in the sound data as parity bits.

In this embodiment of the invention, the parity bit is adopted in the lower bit of the sound data as the error detection bit. However, the least significant bit may be generated by another error detection method.

Diverse modifications and applications may be made by those of skilled in the art based on the description of the specification and known technology without departing from the feature and the range of the present invention, and may be included in the protection range. Further, respective configuration elements in the above-described embodiments may be optionally combined within the range that does not depart from the feature of the present invention.

This application is based on Japanese Patent Application (No. 2008-329334) filed on Dec. 25, 2008, the disclosure of which is incorporated herein by reference in its entirety.

According to the present invention, if the communication environment is deteriorated in a system having packets of a fixed size as a base, the error detection accuracy can be improved while the sound quality is secured to some extent, and thus the present invention is appropriate to a wireless communication device and a wireless communication system, which perform communication by sound packets.

REFERENCE SIGNS LIST

10: MASTER DEVICE
11: SOUND INPUT UNIT
12: PCM CONVERSION UNIT
13: ADPCM ENCODING UNIT
13a: ADAPTIVE QUANTIZER
13b: BIT MASK UNIT
13c: ADAPTIVE INVERSE QUANTIZER
13d: ADAPTIVE PREDICTOR
13f, 13e: ADDER
14: TRANSMISSION CONVERSION TABLE
15: TRANSMISSION CONVERSION TABLE SWITCHING UNIT
15a, 15b: SWITCH
16: TRANSMISSION PACKET GENERATION UNIT
17: WIRELESS TRANSMISSION CIRCUIT
17a: ANTENNA
20: SLAVE DEVICE
21: WIRELESS RECEPTION CIRCUIT
22: RECEPTION CONVERSION TABLE
24: RECEPTION ERROR PROCESSING UNIT
25a, 25b: SWITCH
26: ADPCM DECODING UNIT

26a: FEEDBACK ADAPTIVE INVERSE QUANTIZER
26b: FEED-FORWARD ADAPTIVE INVERSE QUANTIZER
26c: BIT MASK UNIT
26d: ADAPTIVE PREDICTOR
26e, 26f: ADDER
27: PCM CONVERSION UNIT
28: SOUND OUTPUT UNIT
29: RECEIVED ELECTRIC FIELD STRENGTH PROCESSING UNIT

The invention claimed is:

1. A wireless communication device, which includes a base unit and a handset, establishes a digital link on a wireless channel between the base unit and the handset, and performs communication by a sound packet that includes a plurality of digital sound data and error detection bit data, the error detection bit data including at least one bit, the wireless communication device comprising:
a unit that obtains the digital sound data by adaptive differential pulse code modulation (ADPCM), a total number of bits of the respective ADPCM data is fixed, and the error detection bit data being at least one bit except for a plurality of bits input to an adaptive inverse quantizer of the ADPCM,
a data transmission unit which converts a part of the digital sound data into the error detection bit data to transmit the data with the error detection bit data; and
a data conversion unit which converts the digital sound data according to a value of the error detection bit data received from the data transmission unit.

2. The wireless communication device according to claim 1, further comprising an error determination unit which determines a change of an error rate through monitoring of the digital link, wherein
the data transmission unit selects whether or not to convert a part of the digital sound data into the error detection bit data based on a result of the determination by the error determination unit.

3. The wireless communication device according to claim 1, wherein the data conversion unit converts the digital sound data, in which it is determined that an error has occurred by the value of the error detection bit data, into mute data.

4. The wireless communication device according to claim 1, wherein the data conversion unit converts, if it is determined that an error has occurred by the value of the error detection bit data, all the digital sound data in a same frame into the mute data.

5. The wireless communication device according to claim 1, further comprising a received electric field strength level determination unit for determining a change of a received electric field strength through monitoring of the digital link, wherein:
the data transmission unit selects whether or not to convert a part of the digital sound data into the error detection bit data based on a result of the determination by the received electric field strength level determination unit.

6. A wireless communication device which includes a base unit and a handset, establishes a digital link on a wireless channel between the base unit and the handset, and performs communication by a sound packet that includes a plurality of digital sound data and error detection bit data, the error correction including at least one bit, the wireless communication device comprising:
a data transmission unit which converts a part of the digital sound data into the error detection bit data to transmit the data with the error detection bit data;
a data conversion unit which converts the digital sound data according to a value of the error detection bit data received from the data transmission unit;
an error determination unit which determines a change of an error rate through monitoring of the digital link, wherein:
the data transmission unit selects whether or not to convert a part of the digital sound data into the error detection bit data based on a result of the determination by the error determination unit, and
wherein the error determination unit increases or decreases the error rate by an error of data for synchronization and an error of the error detection bit data added to data for a control signal or the entire sound packet.

7. The wireless communication device according to claim 6, wherein the error determination unit increases or decreases the error rate through an error counter by making the error counter count up when it is determined that an error has occurred by the value of the error detection bit data and making the error counter count down when it is determined that an error has not occurred.

8. A wireless communication device which includes a base unit and a handset, establishes a digital link on a wireless channel between the base unit and the handset, and performs communication by a sound packet that includes a plurality of digital sound data and error detection bit data, the error correction including at least one bit, the wireless communication device comprising:
a data transmission unit which converts a part of the digital sound data into the error detection bit data to transmit the data with the error detection bit data; and
a data conversion unit which converts the digital sound data according to a value of the error detection bit data received from the data transmission unit,
wherein the data conversion unit converts the digital sound data, in which it is determined that an error has occurred by the value of the error detection bit data, into the mute data, and converts the digital sound data, in which an error has not occurred in a same frame, into data in which the sound is attenuated.

9. A wireless communication device which includes a base unit and a handset, establishes a digital link on a wireless channel between the base unit and the handset, and performs communication by a sound packet that includes a plurality of digital sound data and error detection bit data, the error correction including at least one bit, the wireless communication device comprising:
a data transmission unit which converts a part of the digital sound data into the error detection bit data to transmit the data with the error detection bit data;
a data conversion unit which converts the digital sound data according to a value of the error detection bit data received from the data transmission unit;
an error determination unit which determines a change of an error rate through monitoring of the digital link, wherein;
the data transmission unit selects whether or not to convert a part of the digital sound data into the error detection bit data based on a result of the determination by the error determination unit, and
wherein the data conversion unit has a plurality of data conversion tables, and the data conversion unit selects one of the plurality of the data conversion tables based on the result of the determination by the error determination unit, and converts the received digital sound data through the selected data conversion table.

10. The wireless communication device according to claim 9, wherein the data conversion unit sets a range of the error rate that corresponds to the plurality of conversion tables, and selects the data conversion table that corresponds to the error rate counted by the error determination unit.

11. A wireless communication system which has a first communication terminal and a second communication terminal, establishes a digital link on a wireless channel between the first communication terminal and the second communication terminal, compresses a sound signal in an adaptive differential pulse code modulation (ADPCM) scheme, and carries the sound signal in a sound packet to perform communication, wherein:

the first communication terminal includes:
an ADPCM encoding unit which converts a pulse code modulation (PCM) signal into ADPCM data and outputs n-bit ADPCM data, where n is an integer equal to or more than two;
a transmission side processing unit which converts the ADPCM data into data having an operation of a parity signal by reversing a least significant bit of the n bits of the ADPCM data according to a number of "1's" comprised in the n bits of the ADPCM data; and
a transmission circuit unit which wirelessly transmits the n-bit data output from the transmission side processing unit, and the second communication terminal includes:
a reception circuit unit which receives a wireless signal sent from the first communication terminal and generates n-bit data from the wireless signal;
a reception side processing unit which determines whether or not an error has occurred according to a number of "1's" comprised in the n-bits of data output from the reception circuit unit and converts the n-bit data, in which it is determined that the error has occurred, into n-bit ADPCM mute data to output the n-bit ADPCM mute data; and
an ADPCM decoding unit which converts the n-bit ADPCM format data from the reception side processing unit into a PCM signal.

* * * * *